Aug. 10, 1926.
F. SEYMOUR
1,595,627
MOVING PICTURE CAMERA
Filed Feb. 9, 1923        2 Sheets-Sheet 1
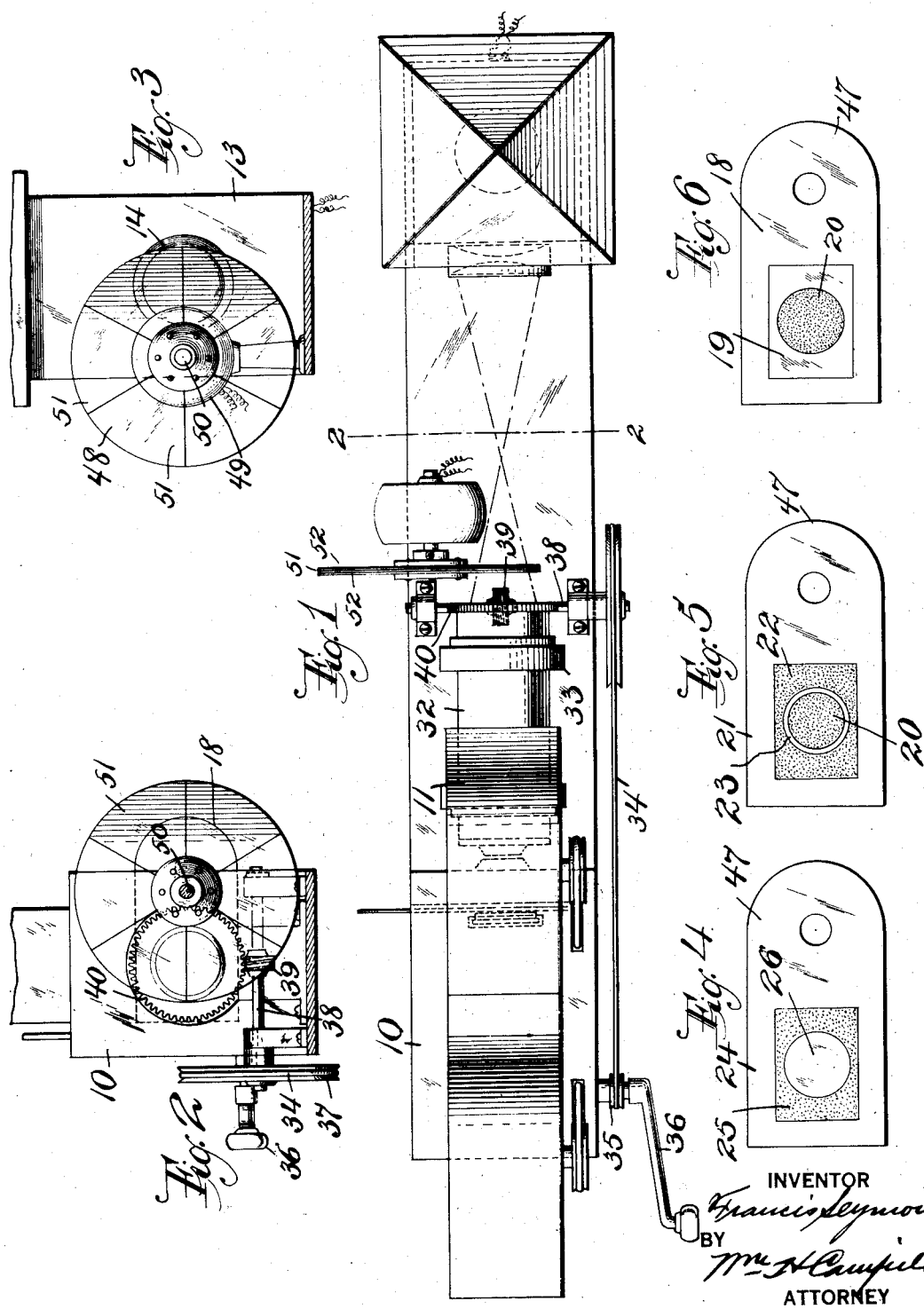
INVENTOR
Francis Seymour,
BY
ATTORNEY Aug. 10, 1926.
F. SEYMOUR
MOVING PICTURE CAMERA
Filed Feb. 9, 1923
1,595,627
2 Sheets-Sheet 2
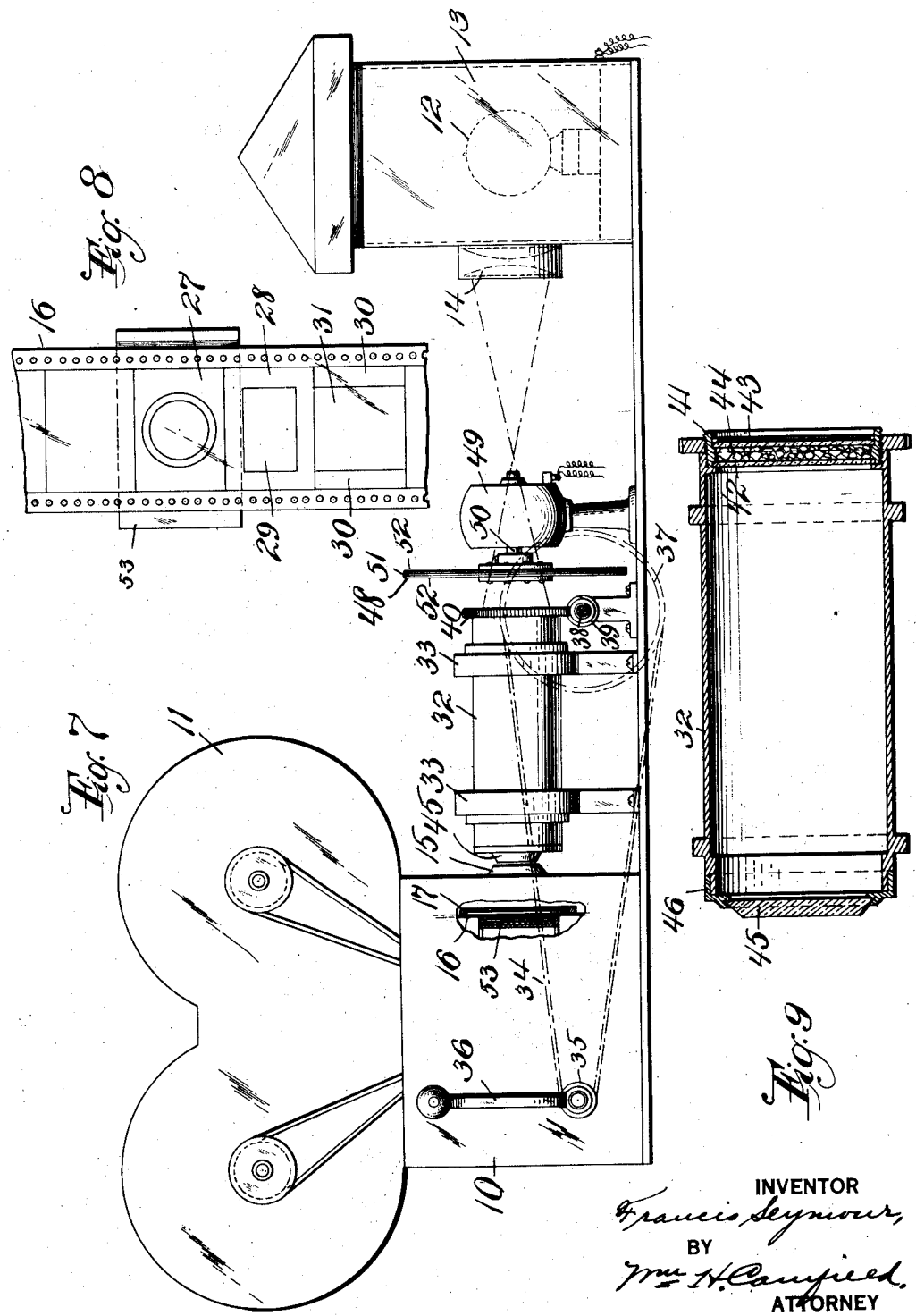
INVENTOR
Francis Seymour,
BY
Wm H Canfield.
ATTORNEY Patented Aug. 10, 1926.

1,595,627

UNITED STATES PATENT OFFICE.

FRANCIS SEYMOUR, OF MIAMI, FLORIDA.

MOVING-PICTURE CAMERA.

Application filed February 9, 1923. Serial No. 617,923.

This invention is designed to provide a camera for taking pictures, and particularly moving pictures, which, when projected, will have kaleidoscopic mats or backings surrounding the main or central portion of the picture, which central portion can be utilized either for the reproduction of a moving picture or for titles, the camera also being adapted to provide, on such reproductions, frames of any desired design interposed between the picture proper in the center and the surrounding mat or background, these being either taken in black and white or in colors.

The invention also relates to certain details of construction to be hereinafter more fully described and finally embodied in the claims.

The invention is illustrated in the accompanying drawings, in which Figure 1 is a top view of a moving picture camera equipped with mechanism according to my invention. Figure 2 is a section on line 2—2, looking toward the camera, and Figure 3 is a section on the same line looking toward the lamp-house. Figures 4, 5 and 6 are face views of stops or cut-outs for the purpose of exposing such parts of the film as desired. Figure 7 is a side view of the construction shown in Figure 1. Figure 8 is a view of a film with the picture spaces thereof subdivided to show the different forms in which pictures can be taken by this apparatus, and Figure 9 is a longitudinal section of a form of kaleidoscope that can be used in the camera.

In the drawings I show, for the purpose of assisting in a clear description, a moving picture camera 10 with the reel holders 11 at the top, the interior mechanism for propelling the film being omitted, since it is well known to those skilled in the art and forms no part of this invention.

Opposite the camera I show a source of light, in this case the light being a bulb 12 in the lamp house 13, the lamp house having a lens 14 on one end thereof, through which the light is projected in a direction so that it will pass through the lens 15 in front of the camera and thus be deposited on the film 16.

Suitable cut-outs or stops are used, these being normally inserted in the holder 17 placed directly in front of the film, these stops being slidable so that they can be easily inserted and removed into and from the camera. A set of these stops is illustrated in Figures 4, 5 and 6.

Assuming that a picture is to be taken on the film 16, the light rays which are projected from the source of light onto the film through the front of the camera are prevented from reaching certain parts of the film, and for the purpose of illustration I will describe first the stop 18 shown in Figure 6, in which the part 19 is transparent and the center part 20 is opaque. It will, of course, be understood that while I have shown the center part 20 as being circular, it may be of any desired conformation. The film is run through the camera, and that part of the film that is behind the part 20 will not be exposed, and that part that is behind the part 19 will be exposed. This exposed part forms the mat or background for the picture or title, which will be eventually in the center of each of the pictures, the part forming the mat being suitably ornamented, or it may have a kaleidoscopic effect by mechanism to be described hereinafter.

After the reel has been run through the camera as above described, the film is wound back and is then subjected to a second exposure with the stop or cut-out 21 inserted, this cut-out having a part 20 similar to the part 20 of the stop 18, and also an opaque part 22 which prevents a second exposure of the mat, but a clear transparent portion, shown at 23, allows exposure of the film to form a frame inside the mat or background and immediately surrounding the picture to be taken, and while this part 23 is shown as being circular and plain, it can be ornamental or it can be of any desired shape. After this exposure the film is rewound, and on a third exposure for recording the title or for taking the picture, the stop 24 is used, in which the opaque part 25 covers all that part that has been previously exposed, and has a transparent portion 26 to permit the taking of the picture in the central portion of each frame or sub-division of the picture on the film, and it will be readily understood that when developed, the finished reel for reproduction will have the central portion occupied by the picture or title, an ornamental frame around such central portion and a mat surrounding the frame and forming a background for the picture.

While these stops or cut-outs are particularly described as applying to this arrangement of picture, which on the reel is shown at 27 in Figure 8, they may be made as at 28 in said figure, in which form a background or mat is shown surrounding the center picture portion 29, in this case a cut-out, as 21, being eliminated to permit the picture itself extending directly to the background or mat without the interposition of the frame, and also at 30 I show a picture with side backgrounds or borders flanking the picture or central portion 31, this form also eliminating the frame.

In order to give a kaleidoscopic effect to the backgrounds or to whatever part of the picture might be exposed through the stops, I mount a kaleidoscope 32 between the lens 14 and the lens 15, this kaleidoscope being rotatable, in the form shown being mounted in bearings 33 and being rotated by a suitable mechanism preferably connected with the handle of the camera. The form of connection shown comprises a belt 34 passing over a pulley 35 on the shaft of the handle 36 of the camera, and passing over a pulley 37 on the shaft 38, this shaft 38 having a worm 39 in mesh with the worm gear 40 on the kaleidoscope 32.

It will be seen that by reason of this connection the kaleidoscope is automatically rotated when the camera is in action and may have interchangeable objects or a small tumbling barrel of various colors and designs, these being quickly changed, if desired, since they are made readily interchangeable. Such a removable barrel is shown at 41 in Figure 9. This barrel may be constructed in many different ways, but I show one in which the front glass 42 is plain and the rear glass 43 is ground glass with the interchangeable tumbling pieces 44, these pieces being such as are commonly used in kaleidoscopes, and when so rotated the kaleidoscope will cause to be projected through the barrel, onto the film, a kaleidoscopic impression which, when reproduced, will give a kaleidoscopic effect.

On the front of the kaleidoscope I arrange a glass 45 which can be clear or colored or have a design thereon, and these can be made in sets so as to be able to use various kinds desired, these being readily slid onto the front end of the kaleidoscope 32.

It will be evident that this form of camera and accessories is readily adapted for color photography.

It will be noted that with the interchangeable ability of the various glasses 45, the mounting 46 of which can be slid onto the end of the kaleidoscope 32, and with the interchangeable barrels 41, I may provide different combinations of kaleidoscopic mats or backgrounds, and an endless variety of designs and colors, and also frames of different colors, designs and kaleidoscopic effects can be provided.

Many different designs can also be made by the interchangeable stops or cut-outs shown in Figures 4, 5 and 6, these being usually in the form of thin plates slidable into the camera from the side, the projecting part 47 of each forming a ready means for handling them and for inserting and withdrawing them.

I may also use in combination with this device a color wheel 48 rotatable in the path of light passing from the source of light to the camera, the color wheel being rotated by any suitable mechanism, such as the small electric motor 49, the color wheel being mounted on the shaft 50 of the motor and having various segmental colored plates 51 (see Figures 2 and 3), these segments or sectors being preferably cut from sheets of colored gelatine of a primary or secondary color, these being secured between two transparent disks 52 of mica or other suitable material. The number of disks can be varied to secure either a slow or rapid change of color.

The color effect projected through the various mechanisms previously described can be emphasized by a mirror 53 placed in a holder directly behind the film and adapted to reflect back on the film such color effects as pass through the film.

I claim:

1. The combination of a motion picture camera, a source of light for projecting rays into the camera, a kaleidoscope in the path of said rays, and a connection for rotating the kaleidoscope when the camera is operated.

2. The combination of a motion picture camera, a source of light for projecting rays into the camera, a kaleidoscope in the path of said rays, and a connection for rotating the kaleidoscope when the camera is operated, said kaleidoscope including interchangeable barrels insertable therein and producing various kaleidoscopic effects when rotated.

3. The combination of a motion picture camera, a source of light for projecting rays into the camera, a kaleidoscope arranged in the path of said rays, said kaleidoscope being mounted so that it can be rotated, interchangeable stops having transparent and opaque portions, and a guide for supporting said stops directly in front of the film.

In testimony that I claim the foregoing, I have hereto set my hand, this 25th day of January, 1923.

FRANCIS SEYMOUR.